United States Patent [19]

Shoji et al.

[11] Patent Number: 4,911,862

[45] Date of Patent: Mar. 27, 1990

[54] OPTICALLY ACTIVE CARBOXYLIC ACID DERIVATIVES AND LIQUID CRYSTALLINE COMPOSITIONS COMPRISING THEM

[75] Inventors: Tadao Shoji; Sadao Takehara, both of Sakura; Toru Fujisawa, Kawaguchi; Masashi Osawa, Sakura; Hiroshi Ogawa, Kawaguchi; Yoshi Arai, Hasuda; Jitsuo Kurokawa, Ohmiya, all of Japan

[73] Assignees: Dainippon Ink and Chemicals, Inc., Tokyo; Kawamura Institute of Chemical Research, Saitama, both of Japan

[21] Appl. No.: 210,375

[22] Filed: Jun. 23, 1988

Related U.S. Application Data

[62] Division of Ser. No. 7,612, Jan. 28, 1987.

[30] Foreign Application Priority Data

| Jan. 31, 1986 | [JP] | Japan | 61-18014 |
| Apr. 7, 1986 | [JP] | Japan | 61-78178 |
| Jun. 17, 1986 | [JP] | Japan | 61-139249 |
| Jun. 18, 1986 | [JP] | Japan | 61-140157 |

[51] Int. Cl.$^4$ .............. C09K 19/12; C09K 19/20; C07C 69/78; C07C 69/76
[52] U.S. Cl. .............. 252/299.65; 252/299.01; 252/299.67; 350/350.5; 560/59; 560/65; 560/73
[58] Field of Search .............. 252/299.01, 299.65; 350/350.5; 560/65, 59

[56] References Cited

U.S. PATENT DOCUMENTS

| 4,542,230 | 9/1985 | Gray et al. | 252/299.65 |
| 4,728,458 | 3/1988 | Higuchi et al. | 252/299.65 |
| 4,737,313 | 4/1988 | Saito et al. | 252/299.65 |
| 4,769,176 | 9/1988 | Bradshaw et al. | 252/299.65 |
| 4,775,223 | 10/1988 | Yoslinaga et al. | 252/299.65 |
| 4,780,242 | 10/1988 | Miyazawa et al. | 252/299.65 |
| 4,795,579 | 1/1989 | Vauchier et al. | 252/299.65 |
| 4,828,754 | 5/1989 | Takehara et al. | 252/299.65 |

FOREIGN PATENT DOCUMENTS

| 188222 | 7/1986 | European Pat. Off. | 252/299.65 |
| 256303 | 2/1988 | European Pat. Off. | 252/299.65 |
| 240385 | 10/1986 | German Democratic Rep. | 252/299.65 |
| 240386 | 10/1986 | German Democratic Rep. | 252/299.65 |
| 62-46 | 6/1987 | Japan . | |
| 62-181238 | 8/1987 | Japan . | |
| 62-181239 | 8/1987 | Japan . | |

*Primary Examiner*—John F. Terapane
*Assistant Examiner*—J. E. Thomas
*Attorney, Agent, or Firm*—Sherman and Shalloway

[57] ABSTRACT

An optically active carboxylic acid derivative represented by the general formula

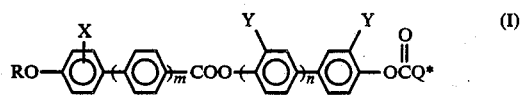

wherein R represents a normal alkyl group having 1 to 20 carbon atoms, m and n represent 0 or 1 but are not 1 at the same time, X represents a hydrogen or halogen atom, Y represents a hydrogen or fluorine atom, provided that when Y is a hydrogen atom, X is a halogen atom, and that when n is 0, Y is a hydrogen atom, and Q* represents an optically active alkyl or 1-alkoxyethyl group having an asymmetric carbon atom.

8 Claims, No Drawings

OPTICALLY ACTIVE CARBOXYLIC ACID DERIVATIVES AND LIQUID CRYSTALLINE COMPOSITIONS COMPRISING THEM

This is a division of Application Ser. No. 007,612, filed January 28, 1987.

This invention relates to an optically active carboxylic acid derivative and a liquid crystalline composition comprising it. More specifically, this invention relates to a compound which is useful as a ferroelectric liquid crystalline material and specifically has a wider effective temperature range and better response than conventional ferroelectric liquid crystalline materials, and to a liquid crystalline composition which comprises the above compound and has a high practical value as a liquid crystal display element.

Liquid crystal display elements now find widespread use because of their various superior characteristics. For example, they are operable at low voltages with a small amount of power consumption, and enable thin display. Moreover, since they are of light-receiving type, they can be used in bright places without burden on eyes. Presently, the most common display mode is a twisted nematic (TN) mode. The TN display mode uses a nematic liquid crystal which has all of the aforesaid characteristics but is quite slow in the speed of response as compared with other light emission type display modes including CRT. Moreover, since breaking of an applied electric field returns the display to the original state, a display memory (memory effect) cannot be obtained. For this reason, much restriction is imposed on application of the TN display mode to a light shutter, a printer head, a TV screen, etc.

In addition to the TN mode, a guest-host (GH) mode, an electrically controlled birefringernce (ECB) mode, a phase change (PC) mode and a thermoelectric mode have been studied and developed for use in liquid crystal display elements having their own unique characteristics. They, however, do not show any particular improvement over the TN mode in respect of response characteristics. On the other hand, a dual-sequence address field mode and a super TN mode have been developed as liquid crystal display modes allowing high-speed response. These display modes show a considerable improvement in response, but still do not prove to be entirely satisfactory. In addition, the dual sequence address field mode has the defect that its operating circuit becomes too complex. The super TN mode is unsuitable for color display because the screen turns yellow. Attempts have therefore been made to develop new liquid crystal display modes having better response characteristics.

Ferroelectric liquid crystals were recently reported [R. Mayer et al., J. Physique, 36, L69 (1975)] as liquid crystals which meet the above purpose. It was pointed out that display elements utilizing the ferroelectric liquid crystals permit response at high speeds 100 to 1000 times the speeds of the conventional liquid crystal display elements and have a memeory effect attributed to bistability [N. A. Clark, S. T. Lagerwall, Appl. Phys. Lett., 36, 899 (1980)]. These display elements are expected to be applied to many display elements in various fields, for example in a TV screen, a high-speed light shutter, a printer head, computer terminals, and the like.

The ferroelectric liquid crystals are those having liquid crystalline phases belonging to tilt-type chiral smectic phases. For practical purposes, a chiral smectic C (hereinafter abbreviated as "$S_C$*") phase having the lowest viscosity is most desirable. Liquid crystalline compounds having a $S_C$* phase have been so far studied and many such compounds have already been known.

Typical examples are Schiff base liquid crystals of (s)-2-methylbutyl p-decyloxybenzylidene-aminocinnamate (abbreviated as "DOBAMBC") and its analogs. DOBAMBC is now one of the most frequently used liquid crystalline compounds for studying the properties and alignment of ferroelectric liquid crystals and represents one standard of the important properties of ferroelectric liquid crystals, such as a helical pitch value, spontaneous polarization, etc. However, DOBAMBC and compounds of its series are not satisfactory for practical application because of one or more drawbacks: (1) they lack light stability; (2) they lack stability to water; (3) they themselves are colored; and (4) the temperature range in which the above compounds enantiotropically show a $S_C$* phase is narrow and within 20° C. and remote from the room temperature range [(1) P. Keller et al., J. de Physique, 37, C3 (1976); (2) ibid, Acad. Sc. Paris, 282, C639 (1976); (3) B. I. Ostrouskii et al., Ferroelectrics, 24, 309 (1980); (4) K. Yoshino et al., Japanese J. Of Appl. Phyusics, 23, L175 (1984); and (5) Isogai et al., Japanese Laid-Open Patent Publication No. 59-98051].

Some azoxy liquid crystals have been known, but they are not suitable for practical use owing to their strong coloration [P. Keller et al., Ann. Phys. 3, 139 (1978)]. To remedy this defect, chemically stable ester-type liquid crystalline compounds have recently been studied, and many reports have already been made.

Reviews introducing a great deal of these compounds are (1) J. W. Goodby et al., Liquid Crystals and Ordered Fluids, vol. 4, pp. 1–32, (2) J. W. Goodby, T. M. Leslie, Mol. Cryst. Liq. Cryst., 110, 175 (1984). M. Isogai et al., EP-0,110,299 may also be cited as a documents describing many such compounds.

As described in the above-cited literature references, ferroelectricity in liquid crystals occurs when the liquid crystals have the tilt-type chiral smectic phases, more specifically a chiral smectic C phase ($S_C$* phase), a chiral smectic F phase ($S_F$* phase), a chiral smectic I phase ($S_I$* phase), a chiral smectic H phase ($S_H$* phase), a chiral smectic G phase ($S_G$* phase), a chiral smectic J phase ($S_J$* phase) and a chiral smectic K phase ($S_K$* phase), and it is said that the $S_C$* phase is most practical. In order for a liquid crystalline compound to have the $S_C$* phase or another chiral smectic phase, it must be a chiral compound. The chiral compound may be obtained by introducing a group having an asymmetric carbon atom, i.e., an optically active group, into the compound.

High-speed response is one characteristic of a ferroelectric liquid crystal. The response time ($\tau$) is approximately represented by the following equation $$\tau = k \cdot \eta / P_s \tag{A}$$

wherein $\eta$ is the viscosity of the liquid crystals, Ps is spontaneous polarization and k is a proportional constant.

Hence, with increasing Ps, the response time decreases and the effectiveness of the ferroelectric liquid crystals appears to an increasing extent.

A widely known liquid crystalline compound called DOBAMBC for short is said to have a spontaneous polarization of about 4 nC (nonacoulomb)/cm$^2$, and many other known compounds have a spontaneous polarization in the range of 1 to 10 nC/cm².

In order for ferroelectric liquid crystals to be useful as display elements in practical applications, they are first required to show an $S_C^*$ phase over a wide temperature range including room temperature. For this purpose, it is the general practice to mix two or more ferroelectric compounds so that the melting points are lowered and the resulting mixture shows a $S_C^*$ phase over a wide temperature range. Generally, a ferroelectric liquid crystal showing a $S_C^*$ phase has a higher viscosity than a smectic C liquid crystal having no asymmetric carbon atom. Accordingly, in practice, there has previously been used a technique by which in order to lower the viscosity of the liquid crystal, a ferroelectric $S_C^*$ composition is prepared by adding a compound or composition showing a $S_C^*$ phase, or having an asymmetric carbon atom but not showing the $S_C^*$ phase, to a smectic C liquid crystal or its composition. It is not particularly important, therefore, to obtain a liquid crystalline composition by mixing ferroelectric liquid crystalline compounds with each other, but this further increases an effect of obtaining high-speed response and a broad $S_C^*$ phase temperature range.

It is an object of this invention to provide a novel liquid crystalline compound which can assume a ferroelectric liquid crystalline phase, particularly a ferroelectric chiral smectic C phase, over a wide temperature range.

Another object of this invention is to provide a liquid crystal display element having high-speed response using such a liquid crystalline compound or a composition comprising it.

According to this invention, there is provided a liquid crystalline composition comprising at least one optically active carboxylic acid derivative represented by the general formula

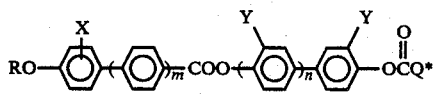

wherein R represents a linear alkyl group having 1 to 20 carbon atoms, m and n represent 0 or 1 but are not 1 at the same time, X represents a hydrogen or halogen atom and Y represents a hydrogen or fluorine atom provided that when Y is a hydrogen atom, X is a fluorine atom and when n is 0, Y is a hydrogen atom, and Q* represents an optically active alkyl or 1-alkoxyethyl group having an asymmetric carbon atom,
or a combination of at least one said compound of formula (I) with at least one other compound.

The present inventors, in the course of developing various liquid crystalline compounds, found that a group of the compounds of general formula (I) are a new group of ferroelectric smectic liquid crystalline compounds having properties not seen in the prior art.

In the ferroelectric smectic liquid crystals so far disclosed, the optically active moiety is an ester linkage derived from the optically active alcohols used as raw materials, an ether linkage, or an optically active alkyl group directly bonded to the central ring portion. The compounds of formula (I) in accordance with this invention are different from these known compounds and are characterized first of all by the fact that the optically active moiety is a group derived from the optically active carboxylic acid.

There are few examples of liquid crystalline compounds synthesized from optically active carboxylic acids. Japanese Laid-Open Patent Publication No. 218,358/1985 discloses liquid crystalline compounds produced by using halogenated optically active carboxylic acid derivatives. These compounds are greatly different in basic skeleton from the compounds (I) of this invention and have a narrower $S_C^*$ phase temperature range. Furthermore, since they are secondary halides, they are unstable and are considered to lack practical utility. Japanese Laid-Open Patent Publication No. 90290/1985 shows in its claim compounds represented by the following general formula

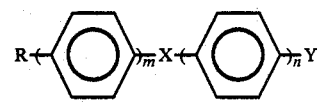

wherein R represents an alkoxy or alkyl group, m and n are 1 or 2, X represents a carbonyloxy group, an oxycarbonyl group, etc., and Y represents an alkoxy carbonyl group, and alkoxy group, an alkanoyl group, an alkanoyloxy group, etc.

Its specification, however, quite fails to give any description of a method of production or physical property values of compounds of the above formula in which Y is an alkanoyloxy group (namely, where optically active carboxylic acids are used as starting materials).

As outlined above, the utilization of optically active carboxylic acids is still not general, and much is unknown of the properties of liquid crystals prepared therefrom. As will be stated hereinafter, when optically active carboxylic acids are utilized in accordance with this invention, many compounds can be prepared which have a greater spontaneous polarization than in the case of utilizing conventional optically active 2-methylbutanol esters. This fact was unexpectedly discovered by the present inventors.

The second characteristic feature of the compounds (I) of this invention is that they are chemically stable since they have halogen-substituted aromatic esters as their central skeleton.

As shown in EP Publication No. 188,222, halogen-substituted compounds bring about various advantages over non-substituted compounds. For example, the halogen-substituted compounds tend to shown a $S_C^*$ phase over a broader temperature range, and have a stronger tendency to fail to show other smectic phases at temperatures lower than the temperatures at which they show a $S_C^*$ phase. Furthermore, when they are mixed as a composition, a larger fall in melting point can be expected. These factors are very important in practical application because if in the production of a composition by mixing two or more compounds in order to lower the melting points, these compounds have other smectic phases at temperatures lower than the temperatures at which they show a $S_C^*$ phase, the resulting composition is liable to have undesirable other smectic phases.

The effectiveness of halogen substitution is shown specifically below with respect to the compounds (I).

(1) With regard to a group of compounds of the following formula

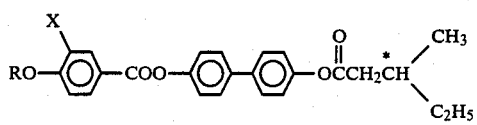

which corresponds to formula (I) in which m=0, n=1, Y=H and

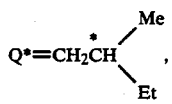

those of the above formula in which X is H show other smectic phases at temperatures lower than the temperatures at which they show a $S_C^*$ phase, whereas those of the above formula in which X is F show only a crystalline phase at temperatures lower than the temperatures at which they show a $S_C^*$ phase.

(2) With regard to a group of compounds of the following formula

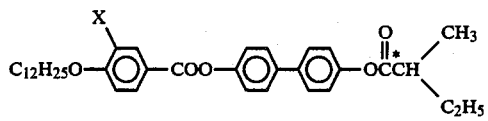

which corresponds to general formula (I) in which R=$C_{12}H_{25}$, m=0, n=1, Y=H and

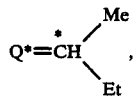

those of the above formula in which X is Cl have the lowest melting point, and those of the above formula in which X is F have the next lowest melting point. Those of the above formula in which X is H have the highest melting point. The fluorine-substituted compounds have the broadest temperature ranges in which they show a $S_C^*$ phase.

Another characteristic of the compounds (I) is that among a group of compounds having three phenyl nuclei (tricyclic), those in which the asymmetric carbon atom Q* is vicinal to the carbonyl group do not easily assume other smectic phases at temperatures lower than the temperatures at which they show a $S_C^*$ phase, and that those having a fluorine substituent at the biphenyl ring, with a few exceptions, do not assume other smectic phases at temperatures lower than the temperatures at which they show a $S_C^*$ phase.

While DOBAMBC has a spontaneous polarization of about 4 nC/cm², the compounds (I) of this invention have a spontaneous polarization of (1) 1 to 4 nC/cm² when Q* is 2-methylbutyl, (2) 3 to 7 nC/cm² when Q* is 1-methylpropyll, and (3) 60 to 130 nC/cm² when Q* is 1-alkoxyethyl. The spontaneous polarization value depends upon the distance between the asymmetric carbon and the permanent dipole existing in a direction perpendicular to the long axis of the molecules of the compound (I). Particularly, the compounds corresponding to (3) have a very large spontaneous polarization because the asymmetric carbon is interposed between two permanent dipoles.

The compounds of general formula (I) are hydroquinone derivatives when m and n are both zero, and biphenol derivatives when n is 1. These hydroquinone and biphenol derivatives readily show a chiral nematic phase (generally called a cholesteric phase) at temperatures higher than the temperatures at which they show a $S_C^*$ phase. The existence of a chiral nematic phase is very important in filling a liquid crystalline compound or a liquid crystalline composition in a liquid crystal cell and uniformly aligning its layers. In the absence of the chiral nematic phase, it is considered as difficult by the present-day technology to obtain uniform alignment after filling the compound or composition into the liquid crystal cell. From this standpoint, the compounds (I) of this invention have a great advantage.

The compound of general formula (I) can be produced by esterification reaction between a compound represented by the general formula

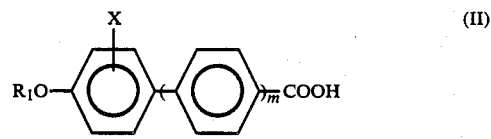

wherein $R_1$ represents a linear alkyl group having 1 to 20 carbon atom, X represents a hydrogen or halogen atom, and m represents 0 or 1, and a compound represented by the general formula

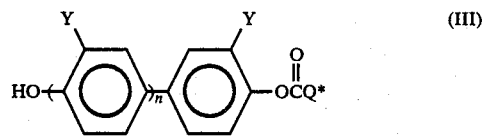

wherein Y represents a hydrogen or fluorine atom, n represents 0 or 1, and Q* represents an optically active alkyl or 1-alkoxyethyl group, provided that when n is 0, Y is a hydrogen atom, for example by condensation reaction using N,N'-dicyclohexylcarbodiimide, and more generally condensing an acid halide corresponding to the compound of general formula (II) with the compound of general formula (III).

The compound of general formula (II) is a 4-alkoxybenzoic acid derivative when m is 0, and a 4'-alkoxybiphenyl-4-carboxylic acid when m is 1. Compounds of the above formula in which X is a hydrogen atom can be obtained by general etherification by condensation between commercially available 4-hydroxybenzoic acid or 4-hydroxybiphenyl-4-carboxylic acid and an alkyl halide. Compounds of the above formula in which X is a halogen atom and m is 0 (4-hydroxy-halogenobenzoic acids) can be produced by the Friedel-Crafts acylation of 2-halogenoanisoles or 3-halogenoanisoles using acetyl chloride, followed by oxidation with a sodium hypobromite solution, and demethylation with a 48% aqueous hydrogen bromide solution, or by bromination of 2-halogenoanisoles, followed by Grignard reagent synthesis, carboxylation by reaction with carbon dioxide, and demethylation with a 48% aqueous hydrogen bromide solution. This series of steps is schematically shown below (the symbols used in this scheme have conventional meanings, and are independent from those used in the general formulae hereinabove).

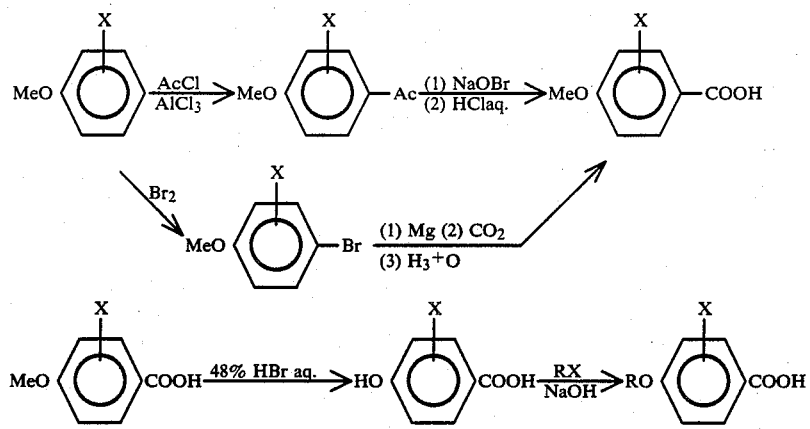

Compounds of formula (II) in which m is 1 and X is a halogen atom (4-hydroxyhalogenobiphenyl-4-carboxylic acids) can be produced by bromination of halogenoanisoles, Grignard reagent synthesis and Grignard coupling reaction with iodobenzene in the presence of palladium chloride, and thereafter reacting the resulting 4-methoxyhalogenobiphenyls in the same way as in the above production of 4-hydroxyhalogenobenzoic acids. This series of steps is schematically shown below (the symbols used in this scheme have conventional meanings, and are independent from those used in the general formulae hereinabove).

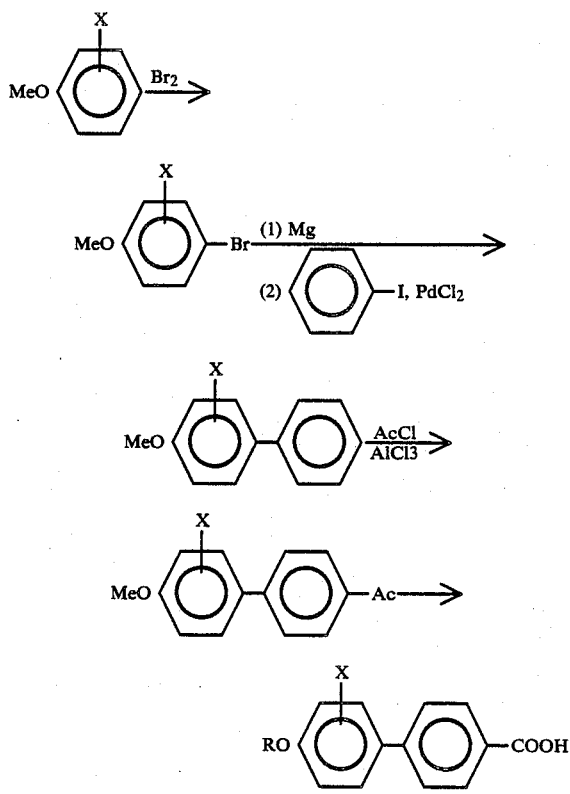

The compounds of general formula (III) can be produced by ester condensation reaction between a compound represented by the general formula

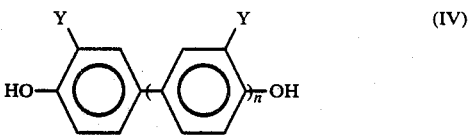

wherein Y represents a hydrogen or fluorine atom, n represents 0 or 1, provided that when n is 0, Y represents a hydrogen atom, with a compound represented by the general formula $$Q^*-COOH \qquad (V)$$

wherein Q* represents an optically active alkyl or 1-alkoxyethyl group.

This ester condensation reaction can be carried out by quite the same procedure as used in the ester condensation reaction between the compound of general formula (II) and the compound of general formula (III).

The compound of general formula (IV) is hydroquinone when n is 0 (i.e., Y=H) and 3,3'-difluoro-4,4'-biphenol when n is 1 and Y is F. 3,3'-Difluoro-4,4'-biphenol can be produced by bromination of 2-fluoroanisole, followed by Grignard reagent synthesis and coupling reaction with 2-fluoro-4-bromoanisole.

The optically active carboxylic acid of general formula (V) can be produced by the oxidation of the corresponding optically active primary alcohol with potassium permanganate, or by Grignard reagent synthesis of an optically active alkyl halide followed by carboxylation with carbon dioxide gas. As a specific example, an optically active 2-alkoxypropionic acid can be produced by etherifiying optically active ethyl lactate with an alkyl iodide in the presence of silver oxide and hydrolyzing the resulting optically active ethyl 2-alkoxypropionate with an alkali. The process of producing the optically active 2-alkoxypropionic acid is shown by the following scheme (the symbols used in this scheme have conventional meanings, and are independent from those used in the general formulae hereinabove).

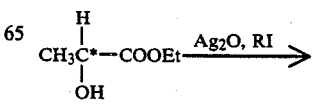

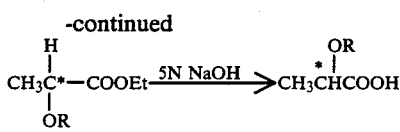

The following Examples and Comparative Examples illustrate the present invention more specifically. It should be understood that the spirit and scope of the present invention are not limited by these examples.

EXAMPLE 1

Synthesis of 4-[(s)-2-methylbutylcarbonyloxy]phenyl 4″-decyloxy-3″-fluorobiphenyl-4′-carboxylate of general formula (I) in which R=n-$C_{10}H_{21}$, X=F, m=1, n=0 and Q*=2-methylbutyl; compound No. S-1):

[1-1] Synthesis of 3′-fluoro-4′-hydroxybiphenyl-4-carboxylic acid:

A 500 ml five-necked flask equipped with a stirrer, a condenser, a nitrogen gas introducing tube, a thermometer and a dropping funnel and adapted to permit releasing of nitrogen gas from the top of the condenser was charged with 2.5 g of flaky metallic magnesium and 120 ml of tetrahydrofuran (dried over sodium metal). A solution of 20.5 g of 3-fluoro-4-methoxybromobenzene in 50 g of dry tetrahydrofuran was fed into the dropping funnel. In a stream of nitrogen gas, the flask was heated while adding dropwise 3-fluoro-4-methoxybromobenzene little by little from the dropping funnel. With gradual reaction, the 3-fluoro-4-methoxybromobenzene was added dropwise over the course of 30 minutes. When the reaction proceeded during the dropwise addition, no external supply of heat is required because the reaction was exothermic. After the addition, the mixture was heated under reflux for 1 hour to produce 3-fluoro-4-methoxyphenyl magnesium bromide. Then, to a flask charged with 20.3 g of iodobenzene, 0.20 g of palladium chloride and 100 ml of dry tetrahydrofuran was added dropwise the above tetrahydrofuran solution of 3-fluoro-4-methoxyphenyl magnesium bromide while the iodobenzene solution was stirred. The addition was carried out over the course of 40 minutes, and the mixture was heated under reflux for 2 hours. Then, the temperature of the reaction mixture was returned to room temperature and 10% hydrochloric acid was added. The mixture was stirred and after adding hexane, further stirred sufficiently. The organic layer was separated, washed with water, and concentrated. From the residue, 3-fluoro-4-methoxybiphenyl was separated by silica gel column chromatography. The amount yielded 11.2 g; yield 55%.

Then, 11.2 g of the resulting 3-fluoro-4-methoxybiphenyl was fed into a reaction flask equipped with a cooling tube together with 4.3 g of acetyl chloride and 100 ml of carbon disulfide. An anhydrous calcium tube was attached to the upper portion of the flask to shut off water. While the flask was cooled with ice, 9.0 g of anhydrous aluminum chloride was added. The mixture was stirred for 2 hours, and then gently heated under reflux for 5 hours.

After the reaction, the reaction mixture was poured into a large amount of 10% hydrochloric acid, and the mixture was fully stirred. The resulting precipitate (9.1 g) was collected by filtration, and recrystallized from isopropyl alcohol to give 7.2 g (yield 53%) of 4-acetyl-3′-fluoro-4′-methoxybiphenyl.

The resulting 4-acetyl-3′-fluoro-4′-methoxybiphenyl (7.2 g) was dissolved in 300 ml of dioxane, and 360 ml of a solution of sodium hypobromite (prepared from 75 g of sodium hydroxide and 78 g of bromine) was added over about 40 minutes at 0° to 5° C., and the mixture was stirred at 30° to 35° C. for 2 hours. The excess of sodium hypobromite was decomposed with a saturated aqueous solution of sodium hydrogen sulfite, and 10% hydrochloric acid was added to adjust the pH of the solution to 3 to 4. The solution was left to stand at 10° C. for 20 hours to permit crystallization. The resulting crystals were filtered to give 7.2 g of 3′-fluoro-4′-methoxybiphenyl-4-carboxylic acid. Recrystallization from isopropyl alcohol gave 6.8 g of the desired product. Yield 94%.

Subsequently, 6.8 g of 3′-fluoro-4′-methoxybiphenyl-4-carboxylic acid was heated under reflux for 14 hours in 150 ml of 48% hydrobromic acid and 80 ml of dioxane. The volatile components were removed by evaporator, and the residue was washed several times with water to give 6.10 g (yield 95%) of the desired 3′-fluoro-4′-hydroxybiphenyl-4-carboxylic acid.

[1-2] Synthesis of 4′-decyloxy-3′-fluorobiphenyl-4-carboxylic acid:

The resulting 3′-fluoro-4′-hydroxybiphenyl-4-carboxylic acid was heated under reflux for 10 hours in hydrous ethanol together with 1.2 moles, per mole of the carboxylic acid, of decyl bromide and 1.95 moles, per mole of the carboxylic acid, of sodium hydroxide. Then, 10% hydrochloric acid was added to adjust the pH of the solution to 2 to 3. The solution was then heated under reflux for 1 hour. After cooling, the organic materials were extracted with chloroform. The chloroform layer was washed with water and dried over anhydrous sodium sulfate. The chloroform layer was concentrated to obtain crude crystals. Recrystallization from ethanol gave the desired 4′-decyloxy-3′-fluorobiphenyl-4-carboxylic acid. The yield in this alkoxylation reaction slightly varies depending upon the type of the alkyl bromide used, but it is generally 60 to 80%.

[1-3] Synthesis of 4-hydroxyphenyl (s)-3-methylpentanoate:

Magnesium flask (2.5 g) and 10 ml of dry tetrahydrofuran were put in a 300 ml flask, and heated under a nitrogen stream, and then a solution of 15.1 g of (s)-2-methylbutyl bromide in 80 ml of tetrahydrofuran was gradually added to prepare a Grignard reagent. Dry tetrahydrofuran (80 ml) was added further, and carbon dioxide gas was blown into the mixture at room temperature, and the reaction was carried out for 2 hours at a reaction temperature of 40° to 60 ° C. After the reaction was ceased, dilute hydrochloric acid was added, and the mixture was diluted with ether. The organic layer was separated, washed with water, dried over anhydrous magnesium sulfate, and concentrated to give 10.1 g (yield 87.0%) of (s)-3-methyl pentanoic acid.

Subsequently, 10.1 g of (s)-3-methylpentanoic acid was stirred together with 20 g of thionyl chloride at 15° to 20° C. for 10 hours. The excess of thionyl chloride was evaporated, and the residue was added to a solution of 22 g of hydroquinone in 100 ml of dry pyridine, and the mixture was stirred at room temperature for 24 hours. After the reaction, pyridine was evaporated under reduced pressure. The residue was dissolved in ethyl acetate, and repeatedly washed with water thoroughly. The ethyl acetate layer was concentrated, and the desired 4-hydroxyphenyl (s)-3-methylpentanate was obtained in an amount of 12.0 g (yield 66%).

[1-4] Synthesis of 4-[(s)-2-methylbutylcarbonyloxy]phenyl 4''-decyloxy-3''-fluorobiphenyl-4'-carboxylate:

Thionyl chloride (8.5 g) was added to 3.72 g of 3'-fluoro-4'-decyloxybiphenyl-4-carboxylic acid, and one drop of pyridine was added. The mixture was heated under reflux for 6 hours. The volatile components were evaporated under reduced pressure, and 20 g of dry pyridine and 2.06 g of 4-hydroxyphenyl (s)-3-methylpentanoate were added. The mixture was stirred at room temperature for 20 hours. After the reaction, the reaction mixture was poured into a large amount of ethyl acetate, and washed with dilute hydrochloric acid three times and subsequently with water three times. The ethyl acetate layer was dried over anhydrous sodium sulfate, and concentrated to give 5.1 g of a residue. The residue was purified by silica gel column chromatography (hexane/ethyl acetate eluent). Recrystallization from ethanol gave 3.60 g (yield 64%) of the desired product.

Nuclear magnetic resonance spectrum [NMR for short), ($CDCl_3$, δ value, (proton)]:

0.80–2.25 (28H); 2.43–2.72 (2H) multiplet; 4.00–4.15 (2H) triplet; 7.01–8.30 (11H).

Infrared absorption spectrum (IR for short) ($cm^{-1}$):

Main absorptions: 2930, 2850, 1750, 1730, 1610, 1515, 1285, 1190, 1090, 815, 765.

Mass spectrum: M/e=562 (C.I. method)

Phase transition temperature: $N^*$-I point=−171.8° C.; $S_A$-$N^*$ point=168.5° C.; $S_C^*$-$S_A$ point=153.6° C.; m.p.=80.2° C.

EXAMPLE 2

Synthesis of 4-[(s)-1-methylpropylcarbonyloxy]phenyl 4''-dodecyloxy-3''-fluorobiphenyl-4'-carboxylate of general formula (I) in which R=n-$C_{12}H_{25}$, X=F, m=1, n=0 and $Q^*$=1-methylpropyl; compound No. S-2):

[2-1] Synthesis of 4-hydroxyphenyl (s)-2-methylbutyrate:

To a flask 10.2 g of (s)-2-methylbutanoic acid and 30 g of thionyl chloride were added and stirred at room temperature for 30 hours. Then, thionyl chloride was evaporated, and the residue was added to 60 ml of a solution of 25.0 g of hydroquinone in dry pyridine. The mixture was stirred at room temperature for 24 hours. Then, pyridine was evaporated under reduced pressure, and the residue was dissolved in ethyl acetate and fully washed with water repeatedly. The ethyl acetate layer was concentrated. The residue was purified by silica gel column chromatography. 12.1 g (yield 62%) of the desired product was obtained from the main fraction.

[2-2] Synthesis of 4-[(s)-1-methylpropylcarbonyloxy]phenyl 4'-dodecyloxy-3''-fluorobiphenyl-4'-carboxylate:

In the same way as described in paragraph [1-4] above, the desired product was obtained in a yield of 69% from 4.0 g of 4'-dodecyloxy-3'-fluorobiphenyl-4-carboxylic acid and 2.01 g of 4-hydroxyphenyl (s)-2-methylbutyrate.

NMR ($CDCl_3$, δ, (proton)

0.80–1.95 (23H); 2.50–2.83 (1H) multiplet; 4.00–4.15 (2H) triplet; 7.03–8.30 (11H).

IR ($cm^{-1}$), main absorptions 2930, 2860, 1750, 1730, 1610, 1515, 1285, 1190, 1090, 815, 715.

Mass spectrum
M/e=576 (C.I. method)
Phase transition temperatures
$S_A$-I point=161.0° C.; $S_C^*$-$S_A$ point=144.3° C.; m.p.=85.9° C.

In the same way as in Examples 1 and 2, the following compounds were synthesized.

4-[(s)-2-Methylbutylcarbonyloxy]phenyl 4''-octyloxy-3''-fluorobiphenyl-4'-carboxylate (compound No. S-3), 4-[(s)-2-Methylbutylcarbonyloxy]phenyl 4''-dodecyloxy-3''-fluorobiphenyl-4'-carboxylate (compound No. S-4), 4-[(s)-2-Methylbutylcarbonyloxy]phenyl 4''-tetradecyloxy-3''-fluorobiphenyl-4'-carboxylate (compound No. S-5), 4-[(s)-1-Methylpropylcarbonyloxy]phenyl 4''-decyloxy-3-fluorobiphenyl-4'-carboxylate (compound No. S-6), 4-[(s)-1-Methylpropylcarbonyloxy]phenyl 4''-decyloxy-3'-chlorobiphenyl-4'-carboxylate (compound No. S-7), and 4-[(s)-2-Methylbutylcarbonyloxy]phenyl 4''-decyloxy-3''-chlorobiphenyl carboxylate (compound No. S-8).

The phase transition temperatures of the compounds obtained in Examples 1 and 2 and compounds Nos. S-3 to S-8 are shown in Table 1.

TABLE 1

Phase transition temperatures of

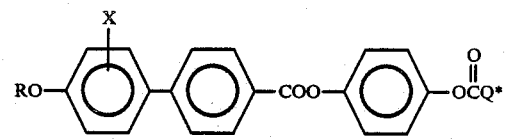

[compounds of formula (I) in which m is 1 and n is 0]

| Compound No. | R | X | Q* | C | Sx | Sc* | $S_A$ | N* | I |
|---|---|---|---|---|---|---|---|---|---|
| S-3 | n-$C_8H_{17}$ | 3 F | 2MB | .81.9 | .113.4 | .135.0 | .154.6 | .164.0 | . |
| S-1 | n-$C_{10}H_{21}$ | 3 F | 2MB | .80.2 | — | .153.6 | .168.5 | .171.8 | . |
| S-4 | n-$C_{12}H_{25}$ | 3 F | 2MB | .66.2 | — | .154.0 | .168.0 | — | . |
| S-5 | n-$C_{14}H_{29}$ | 3 F | 2MB | .70.0 | .81.3 | .141.4 | .155.5 | — | . |
| S-6 | n-$C_{10}H_{21}$ | 3 F | 1MP | .61.4 | — | .110.8 | .157.4 | — | . |
| S-2 | n-$C_{12}H_{25}$ | 3 F | 1MP | .85.9 | — | .144.3 | .161.0 | — | . |
| S-7 | n-$C_{10}H_{21}$ | 3 Cl | 1MP | .26.6 | — | (.12.9) | .33.7 | — | . |
| S-8 | n-$C_{12}H_{25}$ | 3 Cl | 2MB | .44.0 | — | — | (.29.0) | (.42.9) | . |

In column X of Table 1, 3F shows that the fluorine atom is substituted at a position ortho to the alkoxy group of the biphenyl ring, and 3Cl likewise shows that the chlorine atom is substituted ortho to the alkoxy group.

In Table 1, 2MB in the column of Q* represents an optically active 2-methylbutyl group, and 1MP represents an optically active 1-methylpropyl group.

In the column of the phase transition temperature in Table 1, C represents a crystalline phase, $S_X$, an undetermined smectic phase; $S_C^*$, a chiral smectic C phase; $S_A$, a smectic A phase; N*, a chiral nematic phase; and I, an isotropic liquid. The point "." shows the existence of the respective phase, and "-" shows the non-existence of the phase. The parenthesis shows that the phase is monotropic. Namely, that phase exists when the compound is overcooled. These abbreviations used in Tables 2 to 6 below have the same meanings.

EXAMPLE 3

Synthesis of 4-[(s)-1-methylpropylcarbonyloxy]phenyl 4'-decyloxy-3'-fluorobenzoate (compound No. S-9):

[3-1] Synthesis of 4-decyloxy-3-fluorobenzoic acid:

To a flask containing 50 ml of chloroform was added 12.6 g of 2-fluoroanisole, and 16.0 g of bromine was added dropwise over 1 hour at 0° to 10° C. The mixture was stirred at the same temperature for 1 hour, and refluxed at 60° to 63° C. for 6 hours. After the reaction, the chloroform solution was washed with an aqueous solution of sodium hydrogen sulfite, an aqueous solution of sodium bicarbonate, and water, and dried over anhydrous sodium sulfate. The chloroform was evaporated to give 20.1 g of a crude product. The crude product was distilled under reduced pressure to give 16.2 g (yield 79%) of 4-bromo-2-fluoroanisole (95°-96° C./12 mmHg).

Subsequently, as in 1-3 above, the product was subjected to synthesis of a Grignard reagent, blowing of carbon dioxide gas and acid treatment to give 3-fluoro-4-methoxybenozic acid in a yield of 82%. The product was then subjected to demethylation and alkoxylation as in Example 1, [1-1] to give the desired product in a yield of 41% based on 2-fluoroanisole.

[3-2] Synthesis of 4-[(s)-1-methylpropylcarbonyloxy]phenyl 4'-decycloxy-3'-fluorobenzoate:

By the method shown in Example 1, [1-4], the desired product was obtained in a yield of 82% as 4-decyloxy-3-fluorobenzoic acid from the 4-decyloxy-3-fluorobenzoic acid synthesized in Example 3, [3-1] above and 4-hydroxyphenyl (s)-2-methylbutyrate of Example 2, [2-1].

NMR (CDCl₃), δ, (proton)
1.87–2.22 (28H); 2.33–2.70 (2H) multiplet; 4.02–4.17 (2H) triplet; 6.90–7.99 (7H).

IR (cm⁻¹ cm), main absorptions
2930, 2860, 1750, 1730, 1615, 1515, 1305, 1190, 1075, 905, 755.

Mass spectrum
M/e=486 (C.I. method)
Phase transition temperatures
I-$S_A$ point=40.2° C., m.p.=34.4° C.

By the same reaction as in Example 3, the following compounds were obtained.

4-[(s)-1-Methylpropylcarbonyloxy]phenyl 4'-dodecyloxy-3'-chlorobenzoate (compound No. S-10), 4-[(s)-2-Methylbutylcarbonyloxy]phenyl 4'-dodecyloxy-3'-chlorobenzoate (compound No. S-11), 4-[(s)-1-Methylpropylcarbonyloxy]phenyl 4'-decyloxy-2'-chloroenzoate (compound No. S-12), 4-[(s)-2-Methylbutylcarbonyloxy]phenyl 4'-decyloxy-3'-fluorobenzoate (compound No. S-13), 4-[(s)-2-Methylbutylcarbonyloxy]phenyl 4'-tetradecyloxy-3'-fluorobenzoate (compound No. S-14).

4-[(s)-1-Methylpropylcarbonyloxy]phenyl 4'-tetradecyloxy-3'-fluorobenzoate (compound No. S-15).

The phase transition temperatures of the compound obtained in Examples 1 and 2 and compounds Nos. S-10 to S-15 are shown in Table 2.

TABLE 2

Phase transition temperatures of

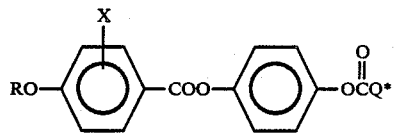

[compounds of general formula (I) in which m = 0, n = 0, Y = H]

| Compound No. | R | X | Q* | C | Sx | Sc* | S_A | N* | I |
|---|---|---|---|---|---|---|---|---|---|
| S-10 | n-C₁₂H₂₅ | 3 Cl | 1MP | .48.6 | — | (.14.8) | (.38.6) | — | . |
| S-11 | n-C₁₂H₂₅ | 3 Cl | 2MB | .50.2 | — | — | — | (.41.7) | . |
| S-12 | n-C₁₀H₂₁ | 2 Cl | 1MP | .23.3 | — | — | — | — | . |
| S-13 | n-C₁₀H₂₁ | 3 F | 2MB | .48.1 | — | — | — | .58.1 | . |
| S-9 | n-C₁₀H₂₁ | 3 F | 1MP | .34.4 | — | — | .37.2 | .40.2 | . |
| S-14 | n-C₁₄H₂₉ | 3 F | 2MB | .67.2 | — | — | — | — | . |
| S-15 | n-C₁₄H₂₉ | 3 F | 1MP | .54.9 | — | — | — | — | . |

As Referential Examples, the following non-halogenated compounds were synthesized and compared.

4-[(s)-2-Methylbutylcarbonyloxy]phenyl 4''-octyloxybiphenyl-4'-carboxylate (compound No. R-1), 4-[(s)-2-Methylbutylcarbonyloxy]phenyl 4''-decyloxybiphenyl-4'-carboxylate (compound No. R-2), 4-[(s)-2-Methylbutylcarbonyloxy]phenyl 4''-dodecyloxybiphenyl-4'-carboxylate (compound No. R-3), 4-[(s)-1-Methylpropylcarbonyloxy]phenyl 4'-decyloxybenzoate (compound No. R-4), and 4-[(s)-1-Methylpropylcarbonyloxy]phenyl 4'-dodecyloxybenzoate (compound No. R-5).

Table 3 shows the phase transition temperatures of compounds Nos. R-1 to R-5 above.

TABLE 3

Phase transition temperatures of

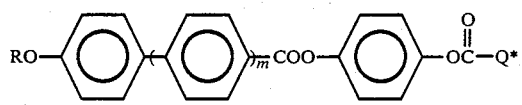

[compounds of general formula (I) in which X = H, n = 0 and Y = H]

| Compound No. | R | m | Q* | C | Sx | Sc* | S$_A$ | N* | I |
|---|---|---|---|---|---|---|---|---|---|
| R-1 | n-C$_8$H$_{17}$ | 1 | 2MB | .100.1 | .103.4 | .160.0 | .188.6 | .199.4 | . |
| R-2 | n-C$_{10}$H$_{21}$ | 1 | 2MB | .97.1 | — | .154.9 | .180.1 | .187.4 | . |
| R-3 | n-C$_{12}$H$_{25}$ | 1 | 2MB | .99.2 | .100.4 | — | .173.6 | .178.4 | . |
| R-4 | n-C$_{10}$H$_{21}$ | 0 | 1MP | .40.8 | — | (.35.5) | .53.7 | — | . |
| R-5 | n-C$_{12}$H$_{25}$ | 0 | 1MP | .34.4 | — | (.30.9) | .53.4 | — | . |

EXAMPLE 4

Synthesis of 4-[(s)-1-methylpropylcarbonyloxy]biphenyl 4'-dodecyloxy-3'-fluorobenzoate (compound No. S-16):

[4-1] Synthesis of 4'-hydroxy-4-biphenyl (s)-2"-methylbutyrate:

50.0 g of 4,4'-biphenol was dissolved in 200 ml of dry pyridine, and a solution of 12.5 g of (s)-2-methylbutyryl chloride in 50 ml of dry methylene chloride and 30 ml of dry pyridine was added dropwise at room temperature for about 1 hour with stirring. The mixture was further stirred at room temperature for 15 hours. Methylene chloride (400 ml) was further added, and the mixture was transferred to a separatory funnel. Dilute hydrochloric acid (300 ml) was added to the separatory funnel, and the mixture was vigorously stirred. The lower methylene chloride layer was separated, and the same operation was carried out twice further. The product was washed with water until the washing became neutral. The methylene chloride layer was concentrated, and from the residue, 9.4 g of the desired 4'-hydroxy-4-biphenyl (s)-2"-methylbutyrate was obtained by silica gel column chromatography using hexane/ethyl acetate as an eluent. The yield of the product based on (s)-2-methylbutyryl chloride was 35%.

[4-2] Synthesis of 4-[(s)-1-methylpropylcarbonyloxy]-4'-biphenyl 4"-dodecyloxy-3"-fluorobenzoate:

In 10 ml of dry pyridine was dissolved 3.4 g of 3-fluoro-4-dodecyloxybenzoyl chloride, and 2.7 g of 4'-hydroxy-4-biphenyl (s)-2"-methylbutyrate produced in [4-1] above was added. The mixture was heated to form a solution. The solution was then stirred at room temperature for 12 hours. The solution was then diluted with ethyl acetate, washed with a dilute aqueous hydrochloric acid solution and washed with water. The ethyl acetate layer was concentrated to give crude crystals. The crude crystals were purified by silica gel column chromatography using hexane/ethyl acetate. Recrystallization from ethanol to give 4.3 g (yield 75%) of the desired product.

NMR (CDCl$_3$),δ, (proton)

0.80–2.05 (31 H) (methyl and methylene protons); 2.43–2.83 (1H) (methine proton); 4.03–4.18 (2H) (methylene protons): 6.92–8.05 (11H) (aromatic protons).

IR (KBr) (cm$^{-1}$), main absorptions 2930, 2860, 1760, 1730, 1615, 1510, 1270, 1210, 1170.

Mass spectrum
M/e=576 (C.I. method)

EXAMPLE 5

Synthesis of 4-[(s)-2-methylbutylcarbonyloxyl]-4'-biphenyl-4"-dodecyloxy-3"-fluorobenzoate (compound No. S-17):

[5-1] Synthesis of 4-[(s)-2-methylbutylcarbonyloxy]-biphenyl-4'-ol:

50.0 g of 4,4'-biphenol was dissolved in 250 ml of dry pyridine, and a solution of 13.5 g of (s)-3-methylbutanoyl chloride in 50 ml of dry methylene chloride and 30 ml of dry pyridine was added dropwise at room temperature over about 1 hour with stirring. Then, the mixture was stirred at room temperature for 15 hours, and 400 ml of methylene chloride was added. The mixture was transferred to a separatory funnel. To the separatory funnel was added 300 ml of dilute hydrochloric acid, and the mixture was vigorously stirred. The lower methylene chloride layer was separated, and then the same operation as above was carried out twice. The methylene layer was then washed with water until the washing became neutral. The methylene chloride layer was concentrated, and from the residue, 9.8 g of 4-[(s)-2-methylbutylcarbonyloxy]biphenyl-4'-ol was obtained by silica gel column chromatography using hexane/ethyl acetate as an eluent. The yield was 35% based on (s)-3-methylbutanoyl chloride.

[5-2] Synthesis of 4-[(s)-2-methylbutylcarbonyloxy]-biphenyl 3'-fluoro-4'-dodecyloxybenzoate:

3.4 g of 3-fluoro-4-dodecyloxybenzoyl chloride was dissolved in 30 ml of dry pyridine, and 2.9 g of 4-[(s)-2-methylbutylcarbonyloxy]biphenyl-4"-ol produced in [5-1] was added. The mixture was heated to form a solution which was stirred at room temperature for 16 hours. The solution was then diluted with ethyl acetate, and washed with dilute hydrochloric acid and waster. The ethyl acetate layer was concentrated to obtain crude crystals. The crude crystals were purified by silica gel column chromatography using hexane/ethyl acetate as an eluent. Recrystallization from ethanol gave 4.7 g (yield 80%) of the desired product.

NMR (CDCl$_3$),δ, (protons)

0.86–2.05 (32H) (methyl, methylene and methine protons); 2.38–2.60 (2H) (methylene proton); 4.08–4.18 (2H) (methylene protons); 7.00–8.15 (17H) (aromatic protons).

IR (KBr) (cm$^{-1}$), main absorptions 2940, 2870, 1755, 1730, 1615, 1500, 1300, 1210, 1180.

Mass spectrum
M/e=590 (C.I. method)

EXAMPLE 6

Synthesis of 4'-[(s)-1-methylpropylcarbonyloxy]-3,3'-difluoro-4-biphenyl 3''-fluoro-4''-dodecyloxybenzoate (compound No. S-18):

Synthesis of 3,3'-difluoro-4,4'-dihydroxybiphenyl:

Flaky metallic magnesium (2.43 g) was added to 50 ml of dry tetrahydrofuran, and while the mixture was heated, a solution of 20.5 g of 4-bromo-2-fluoroanisole in 100 ml of dry tetrahydrofuran was added dropwise little by little in a stream of nitrogen to prepare a tetrahydrofuran solution of 3-fluoro-4-methoxy-phenyl magnesium bromide. Then, 18.0 g of 4-bromo-2-fluoroanisole was added to 100 ml of dry tetrahydrofuran containing 0.05 g of iodine and 0.1 g of palladium chloride. The mixture was maintained at 40° to 50° C. in a stream of nitrogen, and the above-prepared tetrahydrofuran solution of 3-fluoro-4-methoxyphenyl magnesium bromide was added dropwise gradually. The addition was completely in about 1 hour, and thereafter, the mixture was reacted for 5 hours at the refluxing temperature of tetrahydrofuran. After the reaction, the reaction mixture was after-treated in a customary manner to give 38.2 g of a crude product. The desired product was isolated from the crude product by silica gel column chromatography using ethyl acetate/hexane as an eluent. Thus, 15.0 g of 3,3'-difluoro-4,4'-dimethoxybiphenyl was obtained.

NMR (CDCl$_3$),$\delta$, (proton)

3.89 (6H) (methyl protons); 6.86–7.31 (6H) (aromatic protons).

10.0 g of 3,3'-difluoro-4,4'-dimethoxybiphenyl was dissolved in 150 ml of dioxane, and 150 ml of 48% hydrobromic acid was added. The mixture was heated under reflux for 50 hours. After the reaction, the reaction mixture was subjected to evaporation under reduced pressure. The residue was fully washed with water to obtain the desired 3,3'-difluoro-4,4'-dihydroxybiphenyl.

[6-2] A solution of 12.0 g of (s)-2-methylbutyryl chloride in 100 ml of dry methylene chloride was added dropwise to a solution of 33.5 g of 3,3'-difluoro-4,4'-dihydroxybiphenyl in 150 ml of dry pyridine at 0° to 10° C. over 1 hour. Then, the mixture was stirred overnight at room temperature. The reaction mixture was diluted with 200 ml of methylene chloride, and washed several times with dilute hydrochloric acid and then with water to give a methylene chloride solution containing the desired product. The methylene chloride solution was concentrated, and from the residue, 15.1 g of the desired 3,3'-difluoro-4-hydroxybiphenyl (s)-2-methylbutyrate was obtained by silica gel column chromatography using hexane/ethyl acetate as an eluent.

NMR (CDCl$_3$),$\delta$, (proton)

0.90–2.0 (8H) (methyl and methylene protons); 2.55–2.85 (1H) (methine proton); 5.25 (1H) (hydroxyl proton); 6.89–7.50 (6H) (aromatic protons).

[6-3] Synthesis of 4-[(s)-1-methylpropylcarbonyloxy]-3,3''-difluorobiphenyl 4''-dodecyloxy-3''-fluorobenzoate:

3.41 g of 4-dodecyloxy-3-fluorobenzoyl chloride was dissolved in 20 ml of dry pyridine, and 3.09 g of 3,3'-difluoro-4''-hydroxybiphenyl (s)-2-methylbutyrate obtained from 3,3''-difluoro-4,4'-dihydroxybiphenyl was added. The mixture weas heated at 50° to 60° C. to form a solution. The solution was stirred at the same temperature for 1 hour and then for 20 hours at room temperature, then diluted with ethyl acetate, and washed three times with dilute hydrochloric acid and then with water. The ethyl acetate layer was dried over anhydrous sodium sulfate, and concentrated to obtain crude crystals. The crude crystals were purified by silica gel column chromatography using hexane/ethyl acetate as an eluent. Recrystallization from ethanol gave 5.0 g (yield 84%) of the desired product.

NMR (CDCl$_3$),$\delta$, (proton)

0.81–2.05 (31H) (methyl and methylene protons); 2.45–2.85 (1H) (methine proton); 3.96–4.10 (2H) (methylene protons); 6.93–8.05 (9H) (aromatic protons).

IR (KBr) (cm$^{-1}$), main absorptions 2950, 2870, 1760, 1740, 1620, 1595, 1515, 1400, 1340, 1300, 1195, 1130.

Mass spectrum

M/e=612 (C.I. method)

Phase transition temperature

N*-I point=114.8° C., S$_C$*-N* point=103.8° C., m.p.=67.8° C.

EXAMPLE 7

Synthesis of 4-[(s)-2-methylbutylcarbonyloxy]-3,3'-difluorobiphenyl 4''-dodecyloxybenzoate (compound No. S-19):

By carrying out the same reaction, after treatment and purification as in Example 6, [6-2] except that 13.5 g of (s)-3-methylpentanoyl chlroide was used instead of 12.0 g of (s)-2-methylbutyryl chloride, 16.2 g of the desired 3,3'-difluoro-4'-hydroxy-4-biphenyl(s) 3-methylpentanoate was obtained.

NMR (CDCl$_3$),$\delta$, (protons)

0.84–1.65 (8H) (methyl and methylene protons); 1.80–2.78 (3H) (methylene and methine protons); 5.30 (1H) (hydroxyl proton); 6.90–7.35 (6H) (aromatic protons).

Subsequently, 3.2 g of 4-dodecyloxybenzonyl chloride was dissolved in 20 ml of dry pyridine, and 3.20 g of 3,3'-difluoro-4'-hydroxy-4-biphenyl(s) 3-methylpentanoate was added. The mixture was heated to 50° to 60° C. to form a solution. The solution was stirred at the same temperature for 1 hour and then at room temperature for 20 hours. The solution was then diluted with ethyl acetate and washed with dilute hydrochloric acid three times and then with water. The ethyl acetate layer was concentrated to obtain crude crystals. The crude crystals were purified by silica gel column chromatography using hexane/ethyl acetate as an eluent. Recrystallization from ethanol gave 4.82 g (yield 79%) of the desired product.

NMR (CDCl$_3$),$\delta$, (proton)

0.80–2.0 (32H) (methyl, methylene and methine protons); 2.50–2.80 (2H); 4.03–4.17 (2H) (methylene protons); 6.93–8.03 (10H) (aromatic protons).

IR (KBr) (cm$^{-1}$), main absorptions 2950, 2880, 1760, 1740, 1620, 1595, 1515, 1300, 1195, 1130.

Mass spectrum

M/e=608 (C.I. method)

Phase transition temperatures

N*-I point=131.2° C., S$_C$*-N* point=114.0° C., m.p.=79.8° C.

In the same way as in Examples 4, 5, 6 and 7, the following compounds were synthesized.

4'-(s)-1-Methylpropylcarbonyloxy]-4-biphenyl 3''-fluoro-4''-octyloxybenzoate (compound No. S-20), 4'-[(s)-1-Methylpropylcarbonyloxy]-4-biphenyl 3''-fluoro-4''-decyloxybenzoate (compound No. S-21), 4'-[(s)-1-Methylpropylcarbonyloxy]-4-biphenyl 3"-fluoro-4"-tetradecyloxybenzoate (compound No. S-22),
4'-[(s)-1-Methylpropylcarbonyloxy]-4-biphenyl 3"-chloro-4"-dodecyloxybenzoate (compound No. S-23),
4'-[(s)-1-Methylpropylcarbonyloxy]-4-biphenyl 2"-chloro-4"-decyloxybenzoate (compound No. S-24),
4'-[(s)-1-Methylpropylcarbonyloxy]-4-biphenyl 2"-chloro-4"-tetradecyloxybenzote (compound No. S-25),
4'-[(s)-1-Methylpropylcarbonyloxy]-4-biphenyl 3"-fluoro-4"-octyloxybenzoate (compound No. S-26),
4'-[(s)-1-Methylpropylcarbonyloxy]-4-biphenyl 3"-fluoro-4-decyloxybenzoate (compound No. S-27),
4'-[(s)-2-Methylbutylcarbonyloxy]-4-biphenyl 3"-fluoro-4"-tetradecyloxybenzoate (compounds No. S-28),
4'-[(s)-2-Methylbutylcarbonyloxy]-4-biphenyl 3"-chloro-4"-dodecyloxybenzoate (compound No. S-29),
4'-[(s)-1-Methylpropylcarbonyloxy]-3,3'-difluoro-4-biphenyl 3"-fluoro-4"-dodecyloxybenzoate (compound No. S-30),
4'-[(s)-1-Methylpropylcarbonyloxy]-3,3'-difluoro-4-biphenyl 4"-decyloxybenzoate (compound No. S-31),
4'-[(s)-2-Methylbutylcarbonyloxy]-3,3'-difluoro-4-biphenyl 4"-octyloxybenzoate (compound No. S-32),
4'-[(s)-2-Methylbutylcarbonyloxy]-3,3'-difluoro-4-biphenyl 4"-decyloxybenzoate (compound No. S-33),
4'-[(s)-2-Methylbutylcarbonyloxy]-3,3'-difluoro-4-biphenyl 4"-tetradecyloxybenzoate (compound No. S-34),
4'-[(s)-2-Methylbutylcarbonyloxy]-3,3'-difluoro-4-biphenyl 3"-fluoro-4"-octyloxybenzoate (compound No. S-35),
4'-[(s)-2-Methylbutylcarbonyloxy]-3,3'-difluoro-4-biphenyl 3"-fluoro-4"-decyloxybenzoate (compound No. S-36),
4'-[(s)-2-Methylbutylcarbonyloxy]-3,3'-difluoro-4-biphenyl 3"-fluoro-4"-tetradecyloxybenzoate (compound No. S-37), and
4'-[(s)-2-Methylbutylcarbonyloxy]-3,3'-difluoro-4-biphenyl 4"-dodecyloxy-3"-fluorobenzoate (compound No. S-38).

Table 4 shows the phase transition temperatures of compounds Nos. S-16 to S-39.

TABLE 4

Phase transition temperatures of

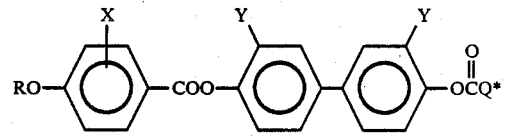

[compounds of general formula (I) in which m is 0 and n is 1]

| Compound No. | R | X | Y | Q* | C | Sx | Sc* | N* | I |
|---|---|---|---|---|---|---|---|---|---|
| S-20 | n-C$_8$H$_{17}$ | 3 F | H | 1MP | .84.7 | — | .140.3 | .159.1 | . |
| S-21 | n-C$_{10}$H$_{21}$ | 3 F | H | 1MP | .95.0 | — | .141.5 | .154.0 | . |
| S-16 | n-C$_{12}$H$_{25}$ | 3 F | H | 1MP | .80.8 | — | .141.2 | .147.9 | . |
| S-22 | n-C$_{14}$H$_{29}$ | 3 F | H | 1MP | .81.2 | — | .140.3 | .144.2 | . |
| S-23 | n-C$_{12}$H$_{25}$ | 3 Cl | H | 1MP | .72.7 | — | .120.4 | .130.0 | . |
| S-24 | n-C$_{10}$H$_{21}$ | 2 Cl | H | 1MP | .68.8 | — | — | .112.2 | . |
| S-25 | n-C$_{14}$H$_{21}$ | 2 Cl | H | 1MP | .57.4 | — | — | .101.6 | . |
| S-26 | n-C$_8$H$_{17}$ | 3 F | H | 2MB | .95.4 | — | .150.3 | .177.6 | . |
| S-27 | n-C$_{10}$H$_{21}$ | 3 F | H | 2MB | .93.5 | — | .151.5 | .170.3 | . |
| S-17 | n-C$_{12}$H$_{25}$ | 3 F | H | 2MB | .87.5 | — | .151.5 | .164.2 | . |
| S-28 | n-C$_{14}$H$_{29}$ | 3 F | H | 2MB | .86.7 | — | .146.1 | .155.6 | . |
| S-29 | n-C$_{12}$H$_{25}$ | 3 Cl | H | 2MB | .85.4 | — | .136.1 | .149.6 | . |
| S-32 | n-C$_8$H$_{17}$ | H | F | 2MB | .49.1 | — | .93.2 | .154.1 | . |
| S-33 | n-C$_{10}$H$_{21}$ | H | F | 2MB | .59.9 | — | .104.8 | .149.0 | . |
| S-19 | n-C$_{12}$H$_{25}$ | H | F | 2MB | .79.8 | — | .114.0 | .131.2 | . |
| S-34 | n-C$_{14}$H$_{29}$ | H | F | 2MB | .76.3 | — | .117.8 | .137.3 | . |
| S-35 | n-C$_8$H$_{17}$ | 3 F | F | 2MB | .76.3 | — | .105.3 | .139.4 | . |
| S-36 | n-C$_{10}$H$_{21}$ | 3 F | F | 2MB | .78.6 | — | .111.2 | .135.3 | . |
| S-37 | n-C$_{12}$H$_{25}$ | 3 F | F | 2MB | .79.8 | — | .114.0 | .131.2 | . |
| S-38 | n-C$_{14}$H$_{29}$ | 3 F | F | 2MB | .83.8 | — | .116.0 | .127.8 | . |
| S-31 | n-C$_{10}$H$_{21}$ | H | F | 1MP | .58.6 | — | .102.6 | .131.0 | . |
| S-30 | n-C$_{12}$H$_{25}$ | H | F | 1MP | .64.7 | — | .107.3 | .127.1 | . |
| S-18 | n-C$_{12}$H$_{25}$ | 3 F | F | 1MP | .67.8 | — | .103.8 | .114.8 | . |

As referential Examples for comparison, the compounds shown in Table 5 were synthesized.

TABLE 5

Phase transition temperatures of

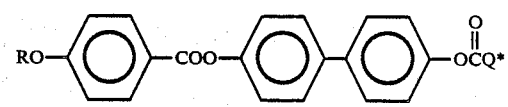

| Compound No. | R | Q* | C | Sx | Sc* | N* | I |
|---|---|---|---|---|---|---|---|
| R-6 | n-C$_8$H$_{17}$ | 1MP | .80.9 | — | .137.3 | .175.4 | . |
| R-7 | n-C$_{10}$H$_{21}$ | 1MP | .87.1 | — | .143.9 | .169.6 | . |
| R-8 | n-C$_{12}$H$_{25}$ | 1MP | .90.3 | — | .147.3 | .162.3 | . |
| R-9 | n-C$_{14}$H$_{29}$ | 1MP | .92.4 | — | .148.3 | .157.8 | . |
| R-10 | n-C$_8$H$_{17}$ | 2MB | .79.1 | .81.8 | .141.4 | .191.0 | . |
| R-11 | n-C$_{10}$H$_{21}$ | 2MB | .87.2 | .89.1 | .149.8 | .83.6 | . |
| R-12 | n-C$_{12}$H$_{25}$ | 2MB | .94.1 | (.83.8) | .153.1 | .175.9 | . |

TABLE 5-continued

Phase transition temperatures of

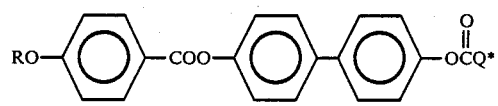

| Compound No. | R | Q* | C | Sx | Sc* | N* | I |
|---|---|---|---|---|---|---|---|
| R-13 | n-C₁₄H₂₉ | 2MB | .96.4 | (.95.9) | .154.6 | .169.8 | . |

EXAMPLE 8

Synthesis of 4-[(s)-1-ethoxyethylcarbonyloxyphenyl]4"-dodecyloxy-3"-fluorobiphenyl-4-carboxylate (compound No. S-39):

[8-1] Synthesis of ethyl (s)-2-ethoxypropionate:

A mixture of 20 g of (s)-(−)-ethyl lactate, 100 ml of N,N'-dimethylformamide, 38 g of ethyl iodide and 30 g of silver oxide was stirred at room temperature for 40 hours. The insoluble materials were separated by filtration and water and hexane were added to the filtrate to separate N,N'-dimethylformamide. The aqueous layer was subsequently extracted twice with hexane, and the hexane layers were dried over anhydrous sodium sulfate. The product was distilled under reduced pressure to give 18.5 g of a fraction having a boiling point of 86°–88° C./75 mmHg. Nuclear magnetic resoanance spectroscopy led to the determination that this fraction was the desired product.

NMR (CDCl₃),δ, (proton)

1.1–1.45 (9H) (methyl protons); 3.29–3.68 (2H) (ethoxy and methylene protons); 3.79–4.03 (1H) (methine proton); 4.03–4.29 (2H) (ester and methylene protons).

[8-2] Synthesis of 4-hydroxyphenyl (s)-2-ethoxypropionate:

9.0 g of the ethyl (s)-2-ethoxypropionate obtained in [8-1] was stirred for 6 hours in 50 ml of a 5N aqueous solution of sodium hydroxide, and then adjusted to pH 3 to 4 with dilute sulfuric acid under ice cooling. The resulting aqueous solution was extracted several times with ether. The ether layers were dried over anhydrous sodium sulfate, and concentrated to obtain 5.6 g of (s)-2-ethoxypropionic acid. $[\alpha]_D^{20} = -36.5$ (c=0.2, chloroform).

NMR (CDCl₃),δ, (proton)

1.12–1.43 (6H) (methine protons); 3.30–3.70 (2H) (ethoxy and methylene protons); 3.78–4.00 (1H) (methine proton).

5.6 g of the resulting (s)-2-ethoxypropionic acid was added to 10 ml of thionyl chloride, and the mixture was refluxed for 5 hours. Thionyl chloride was then evaporated under reduced pressure, and a solution of 9.0 g of hydroquinone in 50 ml of dry pyridine was added, and the mixture was stirred at 30° to 40° C. for 20 hours. The reaction mixture was dissolved in a large amount of ethyl acetate, washed with dilute hydrochloric acid several times and then with water, and dried over anhydrous sodium sulfate. The ethyl acetate solution was concentrated and from the residue, 4.6 g of the desired oily product was obtained by silica gel column chromatography using hexane/ethyl acetate as an eluent.

NMR (CDCl₃),δ, (protons)

1.15–1.30 (3H) (methyl protons); 1.49, 1.57 (3H) (methyl protons) (doublet); 3.40–3.83 (2H) (methylene protons); 3.97–4.28 (1H) (methine proton); 6.33 (1H) (hydroxyl proton); 6.92–7.14 (4H) (aromatic protons).

[8-3] Synthesis of 4-[(s)-1-ethoxyethylcarbonyloxy]phenyl 4"-dodecyloxy-3"-fluorobiphenyl-4'-carboxylate:

Thionyl chloride (8.5 g) was added to 4.0 g of the 4'-dodecyloxy-3'-fluorobiphenyl-4-carboxylic acid synthesized by the method shown in Example 1, and one drop of pyridine was added. The mixture was refluxed for 6 hours. After the reaction, the reaction mixture was concentrated to obtain 4'-dodecyloxy-3'-fluorobiphenyl-4-carbonyl chloride. To the product was added 2.15 g of 4-hydroxyphenyl (s)-2-ethoxypropionate. Furthermore, 10 ml of dry pyridine was added, and the mixture was stirred at room temperature for 20 hours. After the reaction, the reaction mixture was poured into a large amount of ethyl acetate, and the mixture was washed twice with a dilute aqueous solution of hydrochloric acid, and three times with water. The ethyl acetate layer was dried over anhydrous sodium sulfate, and concentrated to give 6.05 g of crude crystals. The desired product was separated by silica gel chromatography using ethyl acetate/hexane as an eluent. Recrystallization from ethanol gave 4.01 g (yield 67%) of the desired product.

NMR (CDCl₃),δ, (protons)

0.80–2.0 (29H) (methyl and methylene protons); 4.38–4.82 (2H) (methylene proton) (ethoxypropionate portion): 3.96–4.10 (2H) (methylene proton) (alkoxybiphenyl portion); 4.00–4.29 (1H) (methine proton); 6.95–8.25 (11H) (aromatic protons).

Mass spectrum

M/e=592 (C.I. method)

Phase transition temperatures $S_A$-I point=150.1° C., $S_C^*$-$S_A$=121.0° C., m.p.=77.4° C.

In the same way as in Example 8, the following compounds were synthesized.

4-[(s)-1-n-propoxyethylcarbonyloxy]phenyl 4"-decyloxy-3"-fluorobiphenyl-4-carboxylate (compound No. S-40), 4-[(s)-1-ethoxyethylcarbonyloxy]phenyl 4"-decyloxy-3"-fluorobiphenyl-4-carboxylate (compound No. S-41), 4-[(s)-1-n-propoxyethylcarbonyloxy]phenyl 3'-decyloxy-3'-fluorobenzoate (compound No. S-42), 4[(s)-1-n-octyloxyethylcarbonyloxy]phenyl 4"-dodecyloxy-3"-fluorobiphenyl-4-carboxylate (compound No. S-43), and 4-[(s)-1-n-octyloxyethylcarbonyloxy]phenyl 3'-fluoro-4'-octyloxybenzoate (compound No. S-44).

For comparison, 4[(s)-1-ethoxyethylcarbonyloxy]phenyl 4'-dodecyloxybenzoate was synthesized. (compound No. R-14).

The phase transition temperatures of these compounds are shown in Table 6.

TABLE 6

Phase transition temperatures of

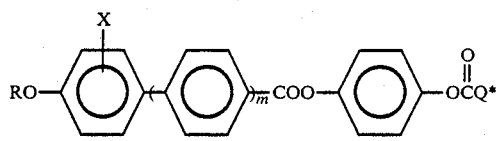

(compounds of formula (I) in which n is 0, Y is H and Q* is 1-alkoxyethyl)

| Compound No. | R | m | X | Q* | C | Sc* | $S_A$ | I |
|---|---|---|---|---|---|---|---|---|
| S-41 | n-$C_{10}H_{21}$ | 1 | 3 F | 1-EtO | .86.5 | .128.3 | .158.5 | . |
| S-39 | n-$C_{12}H_{25}$ | 1 | 3 F | 1-EtO | .77.4 | .121.0 | .150.1 | . |
| S-40 | n-$C_{10}H_{21}$ | 1 | 3 F | 1-PrO | .68.4 | .131.3 | .148.8 | . |
| S-42 | n-$C_{10}H_{21}$ | 0 | 3 F | 1-PrO | .55.1 | — | — | . |
| S-43 | n-$C_{12}H_{25}$ | 1 | 3 F | 1-Oct | .78.6 | .129.3 | .133.9 | . |
| S-44 | n-$C_8H_{17}$ | 0 | 3 F | 1-Oct | .55.9 | — | — | . |
| R-14 | n-$C_{12}H_{25}$ | 0 | H | 1-EtO | .43.7 | — | .49.0 | . |

In Table 6, 1-EtO represents an optically active 1-ethoxyethyl group; 1-PrO, an optically active 1-propoxyethyl group, and 1-Oct, an optically active 1-octyloxyethyl group.

EXAMPLE 9

Compound R-8 (m.p. 90.3° C.), compound S-16 (m.p. 80.8° C.) and compound S-23 (m.p. 72.7° C.) were mixed in amounts of 49 parts, 27 parts and 24 parts, respectively. The resulting composition had a melting point of 57.6° C. which is much lower than the melting point of compound R-8, and showed a $S_C^*$ phase at a temperature in the range of 57.6° to 138.3° C.

EXAMPLE 10

Compound R-6 (m.p. 80.9° C.) and compound S-23 (m.p. 72.7° C.) were mixed in amounts of 49 parts and 51 parts respectively. The resulting composition was very difficult to crystallize and its melting point could not be measured. This composition showed a wide $S_C^*$ phase with the upper limit of the $S_C^*$ phase temperature being 126.2° C.

EXAMPLE 11

Compound S-30, compound S-6 and compound R-5 were mixed in amounts of 30 parts, 35 parts and 35 parts respectively. The resulting composition showed a $S_C^*$ phase at a temperature in the range of 19.1° to 89.5° C. (i.e., even in the room temperature range).

EXAMPLE 12

The spontaneous polarizations of compounds of formula (I) were measured by the triangular wave method, and the results shown in the following table were obtained.

| Compound No. | Spontaneous polarization (nC/cm²) | Measuring temperature (°C.) |
|---|---|---|
| S-2 | 3.1 | 62 |
| S-4 | 1.0 | 64 |
| R-4 | 6.7 | 28 |
| R-5 | 5.7 | 29 |
| S-39 | 50.0 | 80 |
| S-40 | 130.0 | 68 |

EXAMPLE 13

Compound S-4, compound S-1, compound S-6 and compound R-5 were mixed in amounts of 36 parts, 20 parts, 12 parts and 32 parts respectively. The mixture was heat-melted in a stream of nitrogen to form a uniform compostion. This composition enantiotropically showed a $S_C^*$ phase at a temperature of 34° to 110° C. (including temperatures near room temperature).

A thin film cell was constructed by filling this liquid crystalline composition as an isotropic liquid two transparent glass electrodes subjected to rubbing alignment separated by a spacer having a thickness of 2 micrometers. The cell was gradually cooled to obtain a chiral smectic phase as a uniform monodomain. At 55° C., rectangular waves of 100 Hz with a field strength of 20 V.p.p. were applied, and the light switching action was detected by a photomultiplier. Its response speed was 400 microseconds. This led to the determination that the resulting composition can be a liquid crystal display element having a high response speed.

EXAMPLE 14

Fifty partrs of compound S-23 and 50 parts of compound R-6 were heat-melted in a stream of nitrogen to form a uniform liquid which was fully shaken and stirred to form a composition. This composition had a melting point of 20° C. and showed a $S_C^*$ phase at temperatures up to 126° C.

The composition was filled in a cell having a thickness of 2.2 micrometers in the same way as in Example 13, and by applying rectangular waves of 50 Hz and 20 V.p.p. at 50° C., its light switching action was detected. Its response speed was found to be 150 microseconds. This led to the determination that the resulting composition can be a liquid crystal display element having excellent response characteristics.

EXAMPLE 15

Compound S-30, compound S-6 and compound R-5 were mixed in amounts of 45 parts, 22 parts and 33 parts respectively as in Example 13 to form a composition. The resulting composition showed a $S_C^*$ phase at temperatures of from 20° to 103° C.

As in Example 13, this composition was filled in a cell having a thickness of 2.2 micrometers, and its light switching action was detected. With rectangular waves of 20 V.p.p. and 100 Hz, its response speed was as high as 166 microseconds. This led to the determination that the resulting composition can be used as a light switching element.

EXAMPLE 16

Compound S-39, compound S-41 and compound S-6 were mixed in amounts of 28 parts, 12 parts and 60 parts respectively by the same operation as in Example 13 to form a composition which showed a $S_C^*$ phase at a temperature of from 64.1° to 136.6° C.

A cell was constructed as in Example 13 using this composition. At 75° C., rectangular waves of 20 V.P.P. and 100 Hz were applied, and its light switching action was detected. Its response speed was found to be as high as 120 microseconds. This led to the determination that the resulting composition can be a liquid crystal display element having high response.

EXAMPLE 17

Seventy parts of a pyrimidine-type smectic C composition (showing a $S_C$ phase at 10° to 64°0 C.) was mixed with 30 parts of compound S-40 as in Example 13 to form a uniform composition. This composition showed a $S_C^*$ phase at temperatures up to 93° C.

As in Example 13, the resulting composition was filled in a cell having a thickness of 2 micrometers, and rectangular waves of 20 V.p.p. and 100 Hz were applied. It was found that its response speed was 85 microseconds at 50° C. and 93 microseconds at 25° C., showing excellent results. This composition therefore had good temperature characteristics. This led to the determination that the resulting composition can be an excellent light switching element.

What is claimed is:

1. An optically active carboxylic acid derivative represented by the general formula:

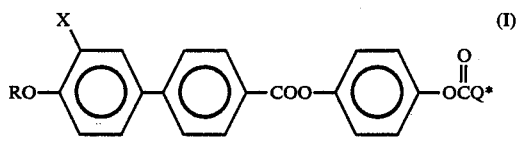

wherein R represents a normal alkyl group having 5 to 20 carbon atoms, X represents a halogen atom, and Q* represents an optically active alkyl group having an asymmetric carbon atom.

2. The compound of claim 1, wherein R represents a linear alkyl group having 5 to 18 carbon atoms.

3. The compound of claim 1 wherein Q* represents an optically active 1-methylpropyl group, or an optically active 2-methylbutyl group.

4. The compound of claim 1 represented by the general formula:

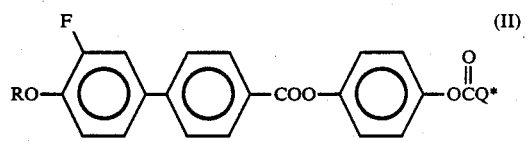

wherein R represents a normal alkyl group having 5 to 20 carbon atoms and Q* represents an optically active alkyl group having an asymmetric carbon atom.

5. The compound of claim 4 wherein R represents a linear alkyl group having 5 to 18 carbon atoms.

6. The compound of claim 4 wherein Q* represents an optically active 1-methylpropyl group, or an optically active 2-methylbutyl group.

7. A liquid crystalline composition comprising at least one compound represented by the general formula according to claim 1.

8. A composition having a chiral smectic C phase which comprises the compound of claim 1.

* * * * *